United States Patent
Ohmura

(10) Patent No.: US 11,325,572 B2
(45) Date of Patent: May 10, 2022

(54) VEHICLE CONTROL DEVICE, METHOD AND COMPUTER PROGRAM PRODUCT

(71) Applicant: Mazda Motor Corporation, Hiroshima (JP)

(72) Inventor: Hiroshi Ohmura, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 123 days.

(21) Appl. No.: 16/819,192

(22) Filed: Mar. 16, 2020

(65) Prior Publication Data
US 2020/0339080 A1    Oct. 29, 2020

(30) Foreign Application Priority Data
Apr. 24, 2019    (JP) .............................. JP2019-082576

(51) Int. Cl.
*B60T 7/22* (2006.01)
*B60R 21/013* (2006.01)
*B60T 8/172* (2006.01)

(52) U.S. Cl.
CPC .............. *B60T 7/22* (2013.01); *B60R 21/013* (2013.01); *B60T 8/172* (2013.01); *B60T 2201/083* (2013.01); *B60T 2210/32* (2013.01)

(58) Field of Classification Search
CPC ...... B60T 7/22; B60T 8/172; B60T 2201/083; B60T 2210/32; B60R 21/013
See application file for complete search history.

(56) References Cited

U.S. PATENT DOCUMENTS

| | | | |
|---|---|---|---|
| 2016/0280266 A1* | 9/2016 | Kawamata | ......... B62D 15/0265 |
| 2019/0066510 A1* | 2/2019 | Salter | ..................... G01S 17/931 |
| 2019/0135247 A1* | 5/2019 | Luo | ......................... B60T 8/3205 |
| 2020/0339079 A1* | 10/2020 | Ohmura | .................... B60T 7/22 |

FOREIGN PATENT DOCUMENTS

| | | | |
|---|---|---|---|
| JP | 2018-95097 A | | 6/2018 |
| JP | 2018173728 A | * | 11/2018 |
| JP | 2018-197964 A | | 12/2018 |

* cited by examiner

*Primary Examiner* — Aniss Chad
*Assistant Examiner* — Madison R Hughes
(74) *Attorney, Agent, or Firm* — Xsensus LLP

(57) ABSTRACT

A vehicle control device includes a crossing vehicle detection sensor configured to detect a crossing vehicle approaching an own vehicle while the own vehicle is traveling in an intersecting lane, the intersecting lane being a lane that intersects an own vehicle lane at an intersection at a time the own vehicle approaches the intersection, the crossing vehicle being a vehicle travelling in the intersecting lane; and a controller configured to automatically brake the own vehicle to avoid a collision between the own vehicle and the crossing vehicle under a condition that the own vehicle enters the intersecting lane. The controller is configured to set, between the own vehicle and the crossing vehicle, a virtual area that moves with the crossing vehicle and that extends in an advancing direction of the crossing vehicle, and automatically brake the own vehicle to prevent the own vehicle from contacting the virtual area.

14 Claims, 6 Drawing Sheets

VEHICLE CONTROL DEVICE, METHOD AND COMPUTER PROGRAM PRODUCT

CROSS-REFERENCE TO RELATED APPLICATION

The present application claims priority to JP 2019-082576, filed Apr. 24, 2019, the entire contents of which are incorporated herein by reference.

BACKGROUND

Field of the Disclosure

The present disclosure relates to a vehicle control device which assists traveling of a vehicle.

Description of the Related Art

Conventionally, to avoid a collision between an own vehicle (i.e., the subject vehicle) as recognized by the present inventor, and a predetermined object (a preceding vehicle, a pedestrian, an obstacle or the like) around the own vehicle, a technique relating to an automatic brake for causing the own vehicle to be automatically braked has been proposed. For example, Japanese Patent Laid-Open No. 2018-95097 (patent document 1) discloses a technique where the crossing position of the travel locus of the own vehicle and the travel locus of an oncoming vehicle is acquired, and the automatic brake is controlled corresponding to the time required for the own vehicle to arrive at this crossing position. Further, for example, Japanese Patent Laid-Open No. 2018-197964 (patent document 2) discloses a technique where a virtual stop line is set on map data based on stop positions of a plurality of vehicles, and an automatic brake is controlled such that the vehicle is caused to stop at this virtual stop line.

SUMMARY OF THE DISCLOSURE

In the conventional technique, to avoid a collision between an own vehicle and an oncoming vehicle when the own vehicle traverses an opposite lane, the automatic brake is controlled basically based on a possibility of a direct collision of the own vehicle with the oncoming vehicle (typically, Time to Collision (TTC) where the own vehicle collides with the oncoming vehicle). However, conventionally, there has been no technique where, when the own vehicle enters an intersecting lane (that is, a lane intersecting with an own-vehicle lane at an intersection), a virtual object which correspond to an object is set, and the automatic brake is controlled not based on the object, but based on this virtual object. That is, there is no technique where the automatic brake is controlled such that the own vehicle is prevented from coming into contact with the virtual object, thus avoiding a collision between the own vehicle and the object eventually. If the automatic brake is controlled based on the virtual object which corresponds to the object as described above, it can be considered that a collision between the own vehicle and the object can be effectively avoided when the own vehicle enters the intersecting lane.

In the technique disclosed in Japanese Patent Laid-Open No. 2018-197964, the virtual stop line is set. However, the object of this technique is to specify a specific stop position, where the own vehicle should be caused to stop, on map data, but is not to avoid a collision between the own vehicle and an object when the own vehicle enters an intersecting lane.

The present disclosure has been made to overcome the above-mentioned and other problems, and it is an object of the present disclosure to provide a vehicle control device which can effectively avoid a collision between the own vehicle and the object by causing the own vehicle to be automatically braked based on a virtual area corresponding to the object, when the own vehicle enters the intersecting lane.

To achieve the above-mentioned and other objects, the present disclosure is directed to a vehicle control device (as well as a method and non-transitory computer readable medium) that includes a crossing vehicle detection sensor configured to detect a crossing vehicle approaching an own vehicle while the own vehicle is traveling in an intersecting lane, the intersecting lane being a lane that intersects an own vehicle lane at an intersection at a time the own vehicle approaches the intersection, the crossing vehicle being a vehicle travelling in the intersecting lane; and a controller configured to automatically brake the own vehicle to avoid a collision between the own vehicle and the crossing vehicle under a condition that the own vehicle enters the intersecting lane. The controller is configured to set, between the own vehicle and the crossing vehicle, a virtual area that moves with the crossing vehicle and that extends in an advancing direction of the crossing vehicle, and automatically brake the own vehicle to prevent the own vehicle from contacting the virtual area.

According to this configuration, the controller sets the virtual area. The virtual area is set to avoid a collision between the own vehicle and the object, and the virtual area forms an application object of a control of causing the own vehicle to be automatically braked.

Specifically, the controller sets, between the own vehicle and the object, the virtual area which moves with advance of the object and which extends in the advancing direction of the object, and performs a control of causing the own vehicle to be automatically braked to prevent a collision of the own vehicle with the object. With such a configuration, it is possible to cause the own vehicle to be stopped at a position relatively separated from the object to avoid a collision between the own vehicle and the object.

The behavior of the object greatly differs depending on a kind the object. If a virtual area is set for an object having a relatively large behavior change in the same manner as another object having a relatively small behavior change, there is the concern that it becomes difficult to avoid a collision between the own vehicle and the object. Further, if an excessively long virtual area is set to avoid a collision between the own vehicle and the object with certainty, there is the concern that the own vehicle is unnecessarily automatically braked, so that smooth traveling of the own vehicle may be interfered or a driver may feel inconvenience.

In view of the above, the controller sets the length of the virtual area corresponding to the kind of the object. With such a configuration, it is possible to avoid a collision between the own vehicle and the object while inhibiting the own vehicle from being unnecessarily automatically braked.

In the present disclosure, the controller is configured to set a base length based on a time required for the own vehicle to finish passing through the intersecting lane where the object advances, or a time required for the own vehicle to finish merging into the intersecting lane where the object advances, set a margin length based on the kind of the object, and set the length of the virtual area based on a length obtained by adding the margin length to the base length. To "merge" means to travel in the advancing direction specified in the intersecting lane.

The own vehicle which finishes passing through the intersecting lane or the own vehicle which finishes merging into the intersecting lane can avoid a collision with an object. That is, "a time required for the own vehicle to finish passing through the intersecting lane where the object advances, or a time required for the own vehicle to finish merging into the intersecting lane where the object advances" means the time required for the own vehicle to finish moving to a position where a collision with the object can be avoided. The base length is set based on the time.

According to the above-mentioned configuration, the controller adds the margin length, which is set corresponding to the kind of the object, to this base length. By setting the length of the virtual area based on the length obtained by such addition, it is possible to avoid a collision between the own vehicle and the object with certainty using the virtual area having the length which correspond to the kind of the object.

In the present disclosure, the controller is configured to set the base length based on a distance obtained by multiplying a speed of the object by a time required for the own vehicle to finish passing through the intersecting lane where the object advances, or by a time required for the own vehicle to finish merging into the intersecting lane where the object advances.

According to this configuration, the base length can be set to a value which corresponds to the time required for the own vehicle to finish moving to a position where a collision with the object can be avoided, and which corresponds to the speed of the object. By setting such a virtual area, it is possible to avoid a collision of the own vehicle with the object with certainty.

In the present disclosure, the controller is configured such that, under a condition that the object is a pedestrian, the controller sets the margin length larger than a margin length in a case where the object is a two-wheeled vehicle.

A pedestrian has a larger behavior change than a two-wheeled vehicle on which the large inertia acts. Particularly, there may be a case where a child suddenly starts to run, thus having a large behavior change.

According to the above-mentioned configuration, the controller sets a margin length for a pedestrian, which is an object having a relatively large behavior change, larger than a margin length for a two-wheeled vehicle, which is an object having a relatively small behavior change. With such a configuration, it is possible to avoid a collision of the own vehicle with a pedestrian with certainty.

According to the vehicle control device of the present disclosure, it is possible to effectively avoid a collision between the own vehicle and the object by causing the own vehicle to be automatically braked based on the virtual area corresponding to the object, when the own vehicle enters the intersecting lane.

DETAILED DESCRIPTION OF THE EMBODIMENTS

Hereinafter, a vehicle control device according to an embodiment will be described with reference to attached drawings.

<Configuration of Vehicle Control Device>

Figure 1:
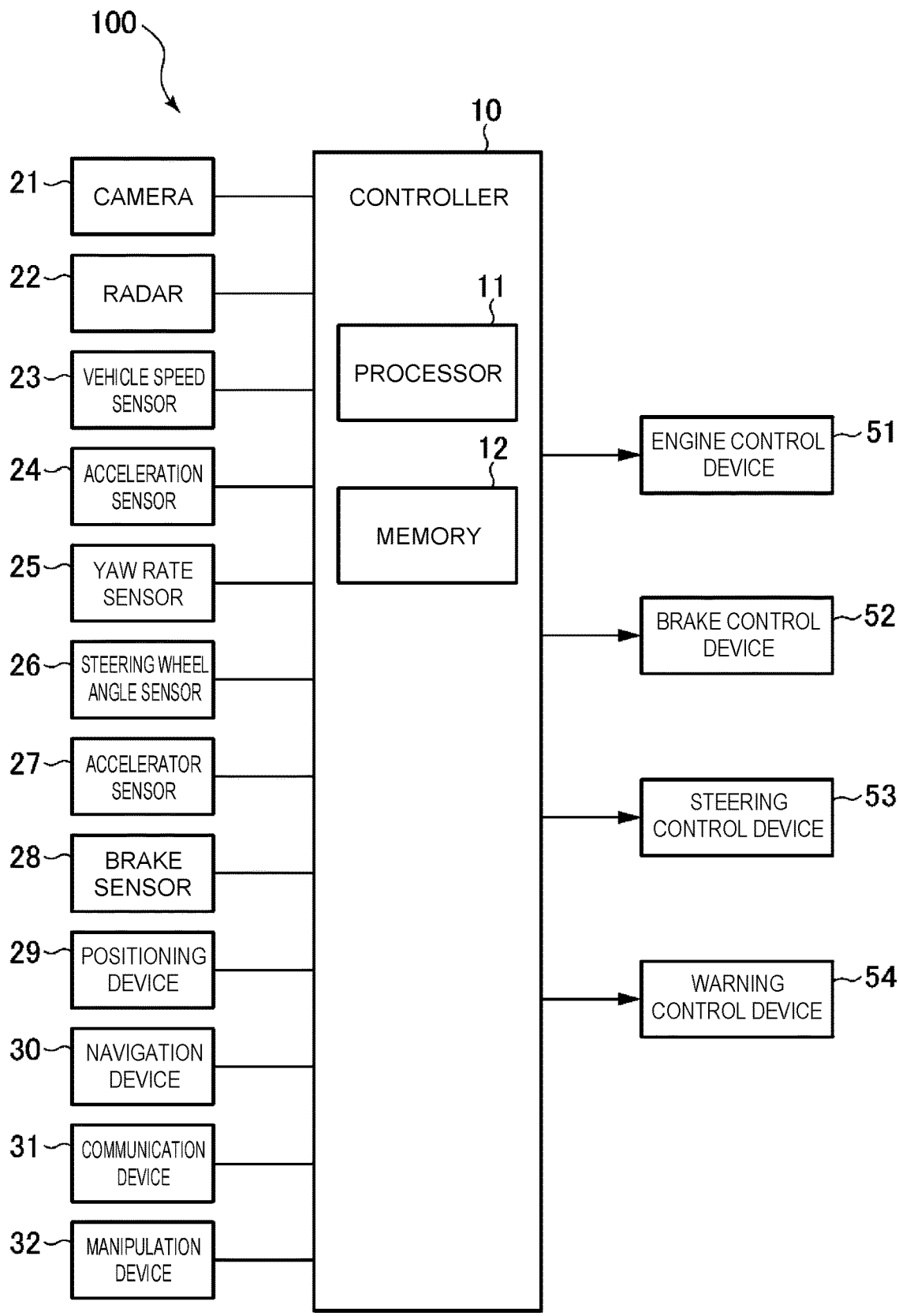
FIG. 1 is a block diagram showing a schematic configuration of a vehicle control device according to an embodiment.

First, the configuration of a vehicle control device 100 according to an embodiment will be described with reference to FIG. 1. FIG. 1 is a block diagram showing a schematic configuration of the vehicle control device 100 according to the embodiment.

As shown in FIG. 1, the vehicle control device 100 mainly includes a controller 10, such as an ECU (Electronic Control Unit), a plurality of sensors and switches, and a plurality of control devices. This vehicle control device 100 is mounted on a vehicle, and performs various controls to assist traveling of the vehicle. Optionally, the ECU may include the processor 835 and other circuitry in system 800 of FIG. 6 which may be implemented as a single processor-based system, or a distributed processor based system, including remote processing, such as cloud based processing The plurality of sensors and switches include a camera 21, (having an image sensor that takes fixed and/or moving images in the visual spectrum and/or non-visual ranges such as infrared and ultraviolet), a radar and/or Lidar 22 (short-range radars, SRR, that operate, for example, in the 20 GHz to 27 GHz range, long range radars, LRR, operating, for example, in the 76 to 81 GHz range, as well as Lidar that operates in at least one of ultraviolet, visible, and near infrared spectrums using lasers having a principle wavelength, for example, in a range of 500 nm to 1000 nm), a plurality of behavior sensors (a vehicle speed sensor 23, an acceleration sensor 24 (example acceleration sensors employ a signal processor connected to a micromechanical comb structure that forms a capacitor with a capacitance set by the spatial distances between comb teeth. When subject to acceleration, relative displacement of comb teeth creates a capacitive change, which is sensed by the signal processor. Piezoelectric, piezoresistive and micro electro-mechanical system (MEMS) sensors may be used as well), a yaw rate sensor 25) which detect behavior of the vehicle and a plurality of behavior switches (a steering wheel angle sensor 26, an accelerator sensor 27, a brake sensor 28), a positioning device 29, a navigation device 30, a communication device 31, and a manipulation device 32. Further, the plurality of control devices include an engine control device 51, a brake control device 52, a steering control device 53, and a warning control device 54, a radar 22, a plurality of behavior sensors (a vehicle speed sensor 23, an acceleration sensor 24, a yaw rate sensor 25) which detect behavior of the vehicle, a plurality of behavior switches (a steering wheel angle sensor 26, an accelerator sensor 27, a brake sensor 28), a positioning device 29, a navigation device 30, a communication device 31, and a manipulation device 32. Further, the plurality of control devices include an engine control device 51, a brake control device 52, a steering control device 53, and a warning control device 54.

The controller 10 is formed of a processor 11, a memory 12, which stores various programs executed by the processor 11, and a computer device including an input/output device and the like. The controller 10 is configured such that, based on signals received from the above-mentioned plurality of sensors and switches, the controller 10 can output control signals for appropriately operating an engine device, a braking device, a steering device, and a warning device to the engine control device 51, the brake control device 52, the steering control device 53, and the warning control device 54. Particularly, in this embodiment, the controller 10 is configured as follows. The controller 10 controls a braking device via the brake control device 52 to avoid a collision between the own vehicle, on which the controller 10 is mounted, and a predetermined object (for example, a crossing vehicle, a preceding vehicle, a pedestrian, an obstacle or the like) around this own vehicle, thus causing the own vehicle to be automatically braked, that is, causing an automatic brake to be operated.

The camera 21 photographs an area around the vehicle (typically, an area in front of the vehicle, and/or an area in a traveling direction of the vehicle, and/or an area in a traveling direction of the vehicle), and outputs image data. The controller 10 identifies various objects based on the image data received from the camera 21. For example, the controller 10 identifies a preceding vehicle, a crossing vehicle, parked vehicles, motorcycles, pedestrians, the traveling road, division lines (a center line, lane boundary lines, white lines, yellow lines), the traffic zone and the traffic division of a lane, traffic lights, traffic signs, stop lines, intersections, obstacles and the like.

The radar 22 measures the kinds, positions and speeds of various objects which are present in the area around the vehicle. For example, the radar 22 measures positions and speeds of an object, such as a preceding vehicle, a crossing vehicle, parked vehicles, motorcycles, pedestrians, or a falling object on the traveling road. A millimeter wave radar may be used as the radar 22, for example. This radar 22 transmits radio waves in the advancing direction of the vehicle, and receives reflected waves generated due to reflection of the transmitted waves on an object. Then, based on the transmitted waves and the received waves, the radar 22 measures a distance between the vehicle and the object (an inter-vehicle distance, for example) and the relative speed of the object with respect to the vehicle.

Note that a laser radar may be used as the radar 22 in place of the millimeter wave radar, or an ultrasonic sensor or another sensor may also be used in place of the radar 22. Further, the position and the speed of an object may also be measured by using the plurality of sensors in combination.

The vehicle speed sensor 23 detects the speed of the vehicle (vehicle speed). The acceleration sensor 24 detects acceleration of the vehicle. The yaw rate sensor 25 detects a yaw rate generated in the vehicle. The steering wheel angle sensor 26 detects the rotation angle (steering angle) of a steering wheel of the vehicle. The accelerator sensor 27 detects the pressing amount of an accelerator pedal. The brake sensor 28 detects the pressing amount of a brake pedal. The controller 10 can calculate the speed of an object based on the speed of the vehicle, which is detected by the vehicle speed sensor 23, and the relative speed of the object, which is detected by the radar 22.

The positioning device 29 includes a GPS receiver and/or a gyro sensor, and detects the position of the vehicle (current vehicle position information). The navigation device 30 stores map information therein, and can provide the map information to the controller 10. Based on map information and current vehicle position information, the controller 10 identifies, roads, intersections, traffic lights, buildings and the like which are present in the area around the vehicle (particularly in the advancing direction). The map information may be stored in the controller 10. Further, the map information may include information relating to the traffic zone and the traffic division of a lane.

The communication device 31 performs inter-vehicle communication with other vehicles around the own vehicle, and performs road-vehicle communication with road-side communication devices installed in the area around the own vehicle. The communication device 31 acquires, through such inter-vehicle communication and road-vehicle communication, communication data from other vehicles and traffic data (traffic congestion information, speed limit information, traffic light information and the like) from transportation infrastructure, and the communication device 31 outputs these data to the controller 10.

The manipulation device 32 (a user interface, tactile and/or visual controlled such as a touch panel) is an input device which is provided in a cabin, and which is operated by a driver for performing various settings relating to the vehicle. For example, the manipulation device 32 includes switches and buttons provided to an instrument panel, a dash panel, and a center console, a touch panel provided to a display device and the like. The manipulation device 32 outputs a manipulation signal which corresponds to the manipulation of the driver to the controller 10. In this embodiment, the manipulation device 32 is configured to be capable of switching between ON and OFF of a control for assisting traveling of the vehicle, and to be capable of adjusting contents of control for assisting traveling of the vehicle. For example, operating the manipulation device 32 allows the driver to switch between ON and OFF of the automatic brake for avoiding a collision between the own vehicle and an object, to perform various setting relating to a virtual area which is used when the automatic brake is performed, to perform setting of warning timing for avoiding a collision between the own vehicle and the object, and to switch between ON and OFF of a control for causing the steering wheel to be vibrated for avoiding a collision between the own vehicle and the object.

At least one of the camera 21, the radar 22, and the communication device 31 is one example of the "object information acquisition sensor" according to the present disclosure.

The engine control device 51 controls the engine of the vehicle. The engine control device 51 is a component which can adjust an engine output (driving force). For example, the engine control device 51 includes a variable valve train and the like which vary opening/closing timing of a spark plug, a fuel injection valve, a throttle valve, and an intake and exhaust valve. When it is necessary to cause the vehicle to accelerate or decelerate, the controller 10 transmits, to the engine control device 51, a control signal to change an engine output.

The brake control device 52 controls the braking device of the vehicle. The brake control device 52 is a component which can adjust a braking force generated by the braking device, and includes brake actuators, such as a hydraulic pump and a valve unit, for example. When it is necessary to cause the vehicle to decelerate, the controller 10 transmits, to the brake control device 52, a control signal to generate a braking force.

The steering control device 53 controls the steering device of the vehicle. The steering control device 53 is a component which can adjust the steering angle of the vehicle, and includes an electric motor and the like of an electric power steering system, for example. When it is necessary to change the advancing direction of the vehicle, the controller 10 transmits, to the steering control device 53, a control signal to change a steering direction.

The warning control device 54 controls a warning device which can issue a predetermined warning to a driver. This warning device may be the display device, a speaker and the like provided to the vehicle. For example, when a possibility of a collision of the own vehicle with an object increases, the controller 10 transmits a control signal to the warning control device 54 to issue a warning from the warning device. In this example, the controller 10 causes an image for notifying a high possibility of a collision with the object to be displayed on the display device, or causes voice for notifying a high possibility of a collision with the object to be outputted from the speaker.

<Automatic Brake Control>

Figure 2:
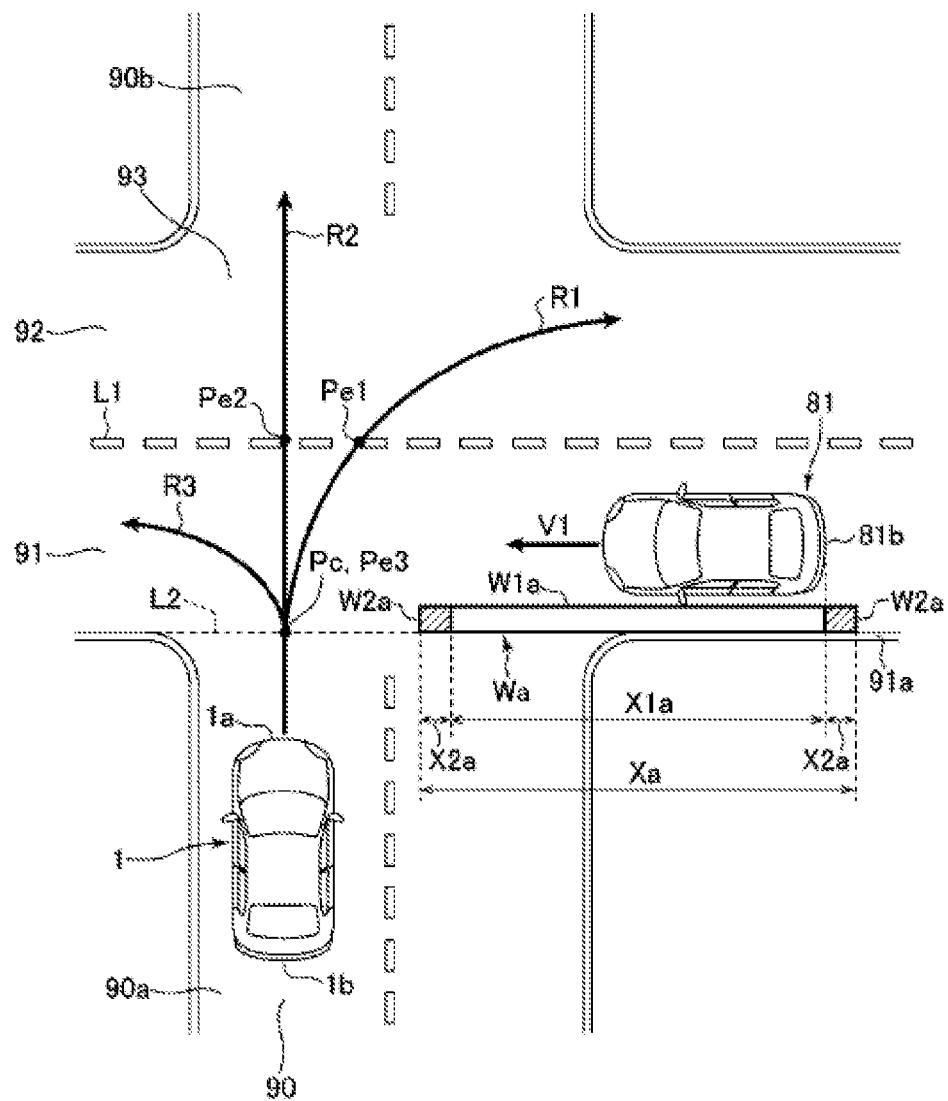
FIG. 2 is an explanatory view of an automatic brake control according to the embodiment.
Figure 3:
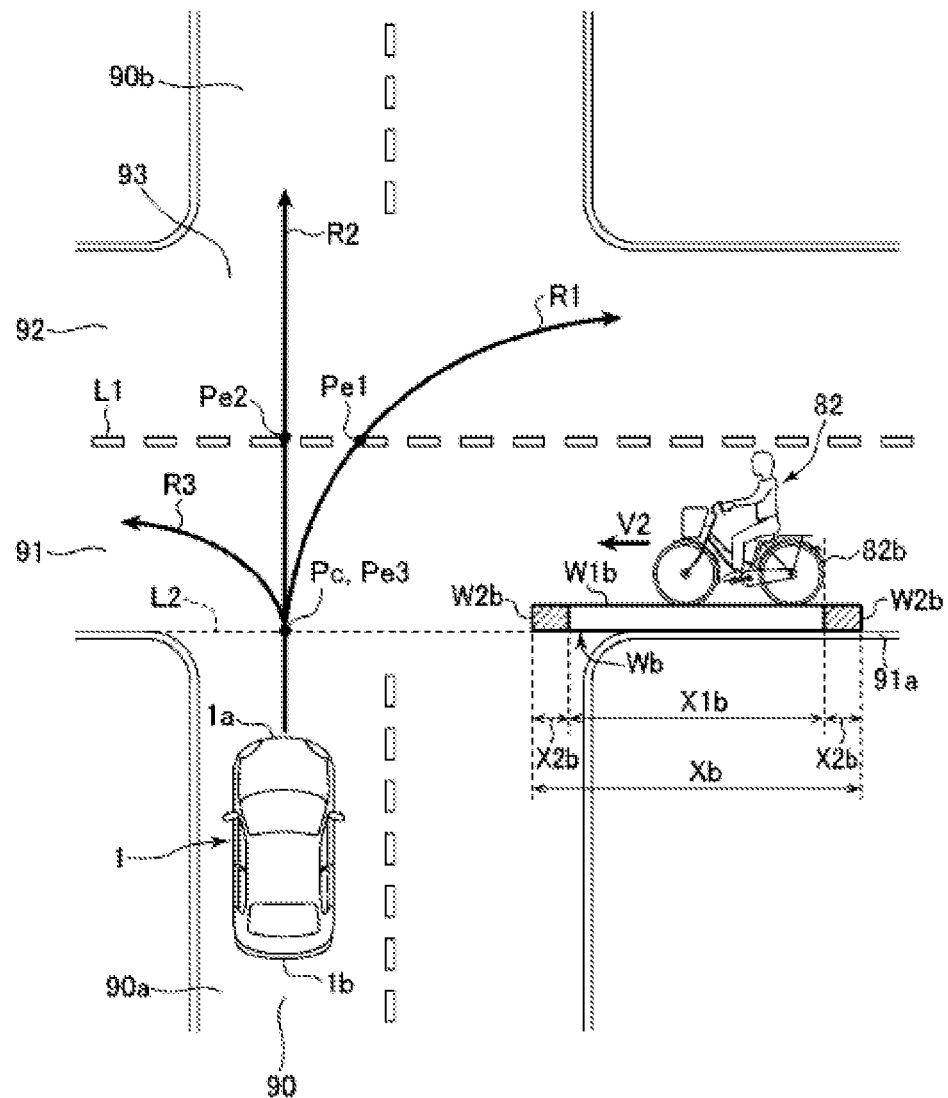
FIG. 3 is an explanatory view of the automatic brake control according to the embodiment.
Figure 4:
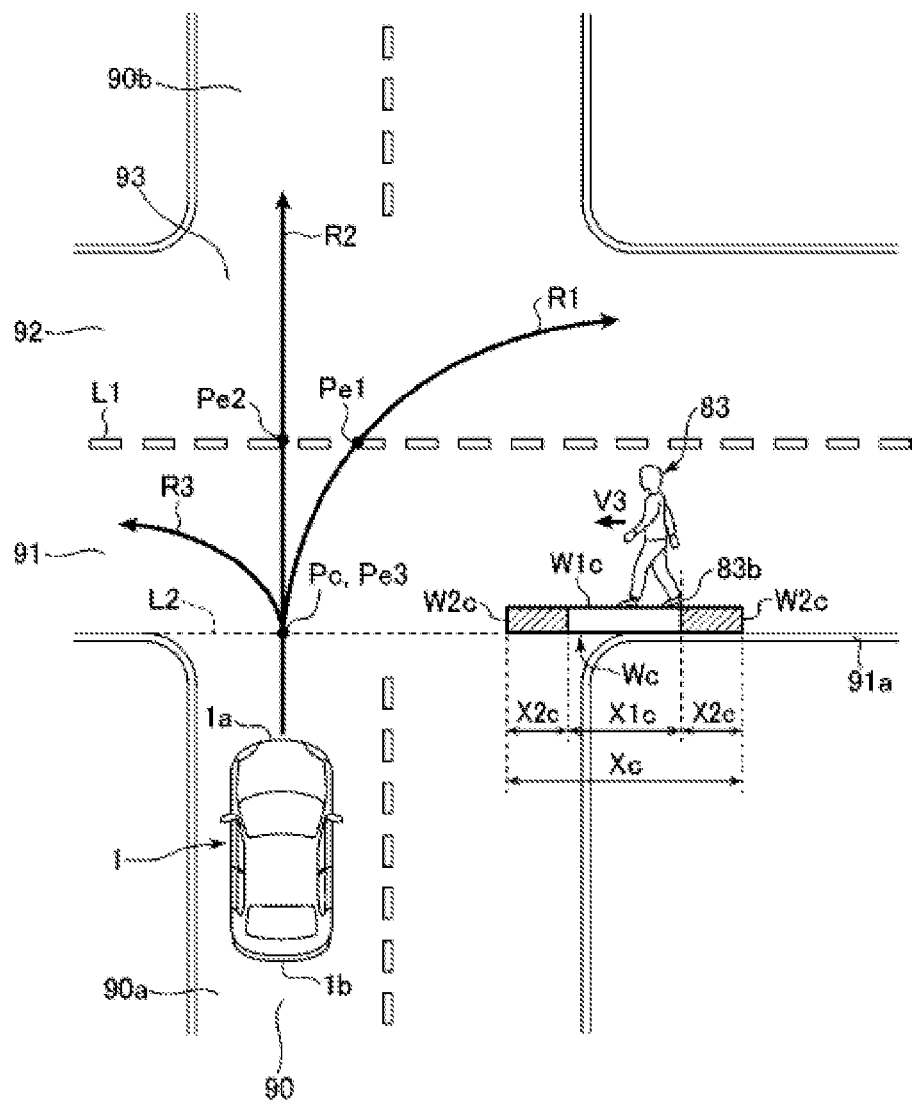
FIG. 4 is an explanatory view of the automatic brake control according to the embodiment.

Next, the automatic brake control according to the embodiment will be described. In this embodiment, when the own vehicle enters an intersecting lane (the intersecting lane meaning a lane intersecting with an own-vehicle lane at an intersection when the own vehicle traveling in the own-vehicle lane approaches the intersection), the controller 10 performs a control of causing the own vehicle to be automatically braked to avoid a collision between the own vehicle and an object advancing in the intersecting lane. FIG. 2 to FIG. 4 show an environment where, as in the case of traffic conditions in Japan, vehicles traveling in the left lane is specified by traffic regulations.

[1. Case where Passenger Car is Approaching]

First, the description will be made, with reference to FIG. 2, with respect to an automatic brake control which is performed in the case where a passenger car approaches the own vehicle. FIG. 2 is an explanatory view of the automatic brake control according to the embodiment.

An own-vehicle lane 90 intersects with two lanes at an intersection 93, and is divided into a first portion 90*a* and a second portion 90*b*. Hereinafter, of the two lanes which intersect with the own-vehicle lane 90, a lane closer to the first portion 90*a* is referred to as "first intersecting lane 91", and a lane closer to the second portion 90*b* is referred to as "second intersecting lane 92". Each of the first intersecting lane 91 and the second intersecting lane 92 is defined by a division line L1.

The controller 10 sets a plurality of sampling points (not shown in the drawing) along the intended path of the own vehicle 1 (that is, a path through which the own vehicle 1 passes in the future). The sampling points are virtual points, and are arranged at predetermined intervals (for example, 10 cm intervals). The controller 10 detects the traveling state of the own vehicle 1 (for example, speed, acceleration, and posture of the own vehicle 1) at each sampling point, and controls the engine and the brake of the own vehicle 1, thus assisting traveling of the own vehicle 1 along the intended path.

The own vehicle 1 travels in the first portion 90*a* of the own-vehicle lane 90, and enters the intersection 93. On the other hand, a crossing vehicle 81, which is a passenger car, is attempting to enter the intersection 93 while advancing in the first intersecting lane 91 at a speed V1 (absolute value). (While the present example is made with reference to traffic rules in Japan, the teachings of the present disclosure apply equally well as adapted to driving rules in the US where vehicles travel in the right lane.)

In such a situation, the controller 10 controls the automatic brake such that a collision between the own vehicle 1 and the crossing vehicle 81 is avoided. The controller 10 sets a virtual area Wa in this control.

[1-1. Virtual Area in Case where Own Vehicle Turns Right at Intersection]

The description will be made with respect to the case where, as in the case of an intended path R1 shown in FIG. 2, the own vehicle 1 turns right at the intersection 93. The own vehicle 1 changes the advancing direction thereof to the rightward direction while entering the first intersecting lane 91. Then, the own vehicle 1 passes through the first intersecting lane 91, and merges into the second intersecting lane 92.

The virtual area Wa is a virtual object which is set to avoid a collision between the own vehicle 1 and the crossing vehicle 81, and which forms an application object of an automatic brake control. The virtual area Wa is set between the own vehicle 1 and the crossing vehicle 81, and extends in the advancing direction of the crossing vehicle 81 along an end portion 91*a* of the first intersecting lane 91. The end portion 91*a* of the first intersecting lane 91 is defined based on curbstones or a white line provided to the first intersecting lane 91, for example. For the portion of the first intersecting lane 91 to which the own-vehicle lane 90 is connected, the controller 10 sets a virtual extension L2 extending along the end portion 91*a*, and sets the virtual area Wa along the extension L2.

Further, the virtual area Wa includes one base portion W1*a* and two margin portions W2*a*. The base portion W1*a* has a length X1*a*, and each margin portion W2*a* has a length X2*a*. One end of the base portion W1*a* is set at the position which corresponds to a rear end 81*b* of the crossing vehicle 81. The margin portion W2*a* is provided to both ends of the base portion W1*a*. That is, a length Xa of the virtual area Wa is expressed by "Xa=X1*a*+2×X2*a*". The length X1*a* is one example of "base length" according to the present disclosure, and the length X2*a* is one example of "margin length" according to the present disclosure.

The controller 10 sets the length X1*a* of the base portion W1*a* of the virtual area Wa corresponding to the time required for the own vehicle 1 to finish passing through the first intersecting lane 91 while turning right. Specifically, the controller 10 first calculates time te1 required for the own vehicle 1 to finish passing through the first intersecting lane 91 (in other words, a time required for the own vehicle 1 to finish entering the second intersecting lane 92). To be more specific, the controller 10 first identifies a point Pe1 where an intended path R1 of the own vehicle 1 and the division line L1 intersect with each other. Further, the controller 10 calculates the time required for the rear end 1*b* of the own vehicle 1 to arrive at the point Pe1 as the time te1 required for the own vehicle 1 to finish passing through the first intersecting lane 91.

The controller 10 sets the length X1*a* of the base portion W1*a* based on the formula expressed by "X1*a*=V1×te1". That is, the controller 10 sets the length X1*a* of the base portion W1*a* to a value which corresponds to the time te1 required for the own vehicle 1 to finish passing through the first intersecting lane 91 and to the speed V1 of the crossing vehicle 81.

In the memory 12 (see FIG. 1), the kinds of a plurality of objects and values which correspond to the respective kinds of objects are stored in advance. Specifically, the memory 12 stores at least "passenger car", "two-wheeled vehicle", and "pedestrian" as the kinds of objects. The memory 12 also stores "Lp", "Lt", and "Lw" as values which correspond to the respective kinds.

In this case, the controller 10 sets the length X2a of the margin portion W2a corresponding to the kind of the crossing vehicle 81. Specifically, the controller 10 reads the value Lp which corresponds to a passenger car from the memory 12, and sets the value Lp as the length X2a of the margin portion W2a. Accordingly, the length Xa of the virtual area Wa in the case where the own vehicle 1 turns right is expressed by "Xa=V1×te1+2×Lp".

[1-2. Virtual Area in Case where Own Vehicle Travels Straight at Intersection]

Next, the description will be made with respect to the case where, as in the case of an intended path R2 shown in FIG. 2, the own vehicle 1 travels straight at the intersection 93. Of the intended path R2, a portion from the own vehicle 1 to the extension L2 is equal to that of the above-mentioned intended path R1. The own vehicle 1 passes through the first intersecting lane 91 and the second intersecting lane 92, and enters the second portion 90b of the own-vehicle lane 90.

The controller 10 sets the length X1a of the base portion W1a corresponding to the time required for the own vehicle 1 to finish passing through the first intersecting lane 91 while traveling straight. Specifically, the controller 10 first calculates time te2 required for the own vehicle 1 to finish passing through the first intersecting lane 91 (in other words, a time required for the own vehicle 1 to finish entering the second intersecting lane 92). To be more specific, the controller 10 first identifies a point Pe2 where an intended path R2 of the own vehicle 1 and the division line L1 intersect with each other. Further, the controller 10 calculates the time required for the rear end 1b of the own vehicle 1 to arrive at the point Pe2 as the time te2 required for the own vehicle 1 to finish passing through the first intersecting lane 91.

The controller 10 sets the length X1a of the base portion W1a based on the formula expressed by "X1a=V1×te2". That is, the controller 10 sets the length X1a of the base portion W1a to a value which corresponds to the time te2 required for the own vehicle 1 to finish passing through the first intersecting lane 91 and to the speed V1 of the crossing vehicle 81.

Further, as described above, the controller 10 reads the value Lp which corresponds to a passenger car from the memory 12, and sets the value Lp as the length X2a of the margin portion W2a. Accordingly, the length Xa of the virtual area Wa in the case where the own vehicle 1 travels straight is expressed by "Xa=V1×te2+2×Lp".

[1-3. Virtual Area in Case where Own Vehicle Turns Left at Intersection]

Next, the description will be made with respect to the case where, as in the case of an intended path R3 shown in FIG. 2, the own vehicle 1 turns left at the intersection 93. Of the intended path R3, a portion from the own vehicle 1 to the extension L2 is equal to that of the above-mentioned intended path R1. The own vehicle 1 turns left at the intersection 93, and merges into the first intersecting lane 91.

The controller 10 sets the length X1a of the base portion W1a corresponding to the time required for the own vehicle 1 to finish merging into the first intersecting lane 91 while turning left. Specifically, the controller 10 first calculates time te3 required for the own vehicle 1 to finish merging into the first intersecting lane 91 (in other words, a time required for the own vehicle 1 to finish passing through the first portion 90a of the own-vehicle lane 90). To be more specific, the controller 10 first identifies a point Pe3 where an intended path R3 of the own vehicle 1 and an extension L2 intersect with each other. Further, the controller 10 calculates the time required for the rear end 1b of the own vehicle 1 to arrive at the point Pe3 as the time te3 required for the own vehicle 1 to finish merging into the first intersecting lane 91.

The controller 10 sets the length X1a of the base portion W1a based on the formula expressed by "X1a=V1×te3". That is, the controller 10 sets the length X1a of the base portion W1a to a value which corresponds to the time te3 required for the own vehicle 1 to finish merging into the first intersecting lane 91 and to the speed V1 of the crossing vehicle 81.

Further, as described above, the controller 10 reads the value Lp which corresponds to a passenger car from the memory 12, and sets the value Lp as the length X2a of the margin portion W2a. Accordingly, the length Xa of the virtual area Wa in the case where the own vehicle 1 turns left is expressed by "Xa=V1×te3+2×Lp".

[1-4. Automatic Brake Control which Uses Virtual Area]

The controller 10 causes the virtual area Wa having such a shape to move with the advance of the crossing vehicle 81 (in other words, causes the virtual area Wa to advance toward the own vehicle 1 together with the crossing vehicle 81). The controller 10 controls the automatic brake to prevent the own vehicle 1 from contacting with this virtual area Wa.

Specifically, the controller 10 first identifies a point Pc where the intended paths R1 to R3 of the own vehicle 1 and the extension L2 intersect with each other. In this embodiment, the point Pc is equal to the above-mentioned point Pe3.

The controller 10 calculates Time to Collision/predicted time to collision (TTC) of the own vehicle 1 with respect to the virtual area Wa. Specifically, the controller 10 calculates the time required for a front end 1a of the own vehicle 1 to arrive at the point Pc based on the speed and acceleration of the own vehicle 1 and the distance from the own vehicle 1 to the point Pc.

The controller 10 determines whether or not it is necessary to perform an automatic brake based on TTC calculated as described above. When the controller 10 determines that the automatic brake is necessary, the controller 10 controls the braking device via the brake control device 52 to cause the own vehicle 1 to stop without protruding to the first intersecting lane 91.

[2. Case where Two-Wheeled Vehicle is Approaching]

Next, the description will be made, with reference to FIG. 3, with respect to an automatic brake control which is performed in the case where a two-wheeled vehicle approaches the own vehicle. FIG. 3 is an explanatory view of the automatic brake control according to the embodiment. The description of configurations and processes which are substantially equal to those in the above-mentioned case will be omitted when appropriate.

The own vehicle 1 travels in the first portion 90a of the own-vehicle lane 90, and enters the intersection 93. On the other hand, a two-wheeled vehicle 82 is attempting to enter the intersection 93 while advancing in the first intersecting lane 91 at a speed V2 (absolute value).

The controller 10 sets a virtual area Wb to avoid a collision between the own vehicle 1 and the two-wheeled vehicle 82. The virtual area Wb is set between the own vehicle 1 and the two-wheeled vehicle 82, and extends in the advancing direction of the two-wheeled vehicle 82 along an end portion 91a of the first intersecting lane 91.

Further, the virtual area Wb includes one base portion W1b and two margin portions W2b. The base portion W1b has a length X1b, and each margin portion W2b has a length X2b. One end of the base portion W1b is set at the position which corresponds to a rear end 82b of the two-wheeled vehicle 82. The margin portion W2b is provided to both ends of the base portion W1b. That is, a length Xb of the virtual area Wb is expressed by "Xb=X1b+2×X2b". The length X1b is one example of "base length" according to the present disclosure, and the length X2b is one example of "margin length" according to the present disclosure.

In the case where the own vehicle 1 is caused to travel along the intended path R1, the controller 10 sets the length X1b of the base portion W1b based on the formula expressed by "X1b=V2×te1". That is, the controller 10 sets the length X1b of the base portion W1b to a value which corresponds to the time te1 required for the own vehicle 1 to finish passing through the first intersecting lane 91 while turning right and to the speed V2 of the two-wheeled vehicle 82.

In the case where the own vehicle 1 is caused to travel along the intended path R2, the controller 10 sets the length X1b of the base portion W1b based on the formula expressed by "X1b=V2×te2". That is, the controller 10 sets the length X1b of the base portion W1b to a value which corresponds to the time te2 required for the own vehicle 1 to finish passing through the first intersecting lane 91 while traveling straight and to the speed V2 of the two-wheeled vehicle 82.

In the case where the own vehicle 1 is caused to travel along the intended path R3, the controller 10 sets the length X1b of the base portion W1b based on the formula expressed by "X1b=V2×te3". That is, the controller 10 sets the length X1b of the base portion W1b to a value which corresponds to the time te3 required for the own vehicle 1 to finish merging into the first intersecting lane 91 while turning left and to the speed V2 of the two-wheeled vehicle 82.

In any of the cases where the own vehicle 1 is caused to travel along any one of the intended paths R1 to R3, the controller 10 reads the value Lt which corresponds to a two-wheeled vehicle from the memory 12, and sets the value Lt as the length X2b of the margin portion W2b. The value Lt is larger than the value Lp which corresponds to a passenger car.

The controller 10 causes the virtual area Wb having such a shape to move with the advance of the two-wheeled vehicle 82 (in other words, causes the virtual area Wb to advance toward the own vehicle 1 together with the two-wheeled vehicle 82). The controller 10 controls the automatic brake to prevent the own vehicle 1 from contacting with this virtual area Wb in the same manner as the case where a passenger car is approaching.

[3. Case where Pedestrian is Approaching]

Next, the description will be made, with reference to FIG. 4, with respect to an automatic brake control which is performed in the case where a pedestrian approaches the own vehicle. FIG. 4 is an explanatory view of the automatic brake control according to the embodiment. The description of configurations and processes which are substantially equal to those in the above-mentioned case will be omitted when appropriate.

The own vehicle 1 travels in the first portion 90a of the own-vehicle lane 90, and enters the intersection 93. On the other hand, a pedestrian 83 is attempting to enter the intersection 93 while advancing in the first intersecting lane 91 at a speed V3 (absolute value).

The controller 10 sets a virtual area Wc to avoid a collision between the own vehicle 1 and the pedestrian 83. The virtual area Wc is set between the own vehicle 1 and the pedestrian 83, and extends in the advancing direction of the pedestrian 83 along the end portion 91a of the first intersecting lane 91.

Further, the virtual area Wc includes one base portion W1c and two margin portions W2c. The base portion W1c has a length X1c, and each margin portion W2c has a length X2c. One end of the base portion W1c is set at the position which corresponds to a rear end 83b of the pedestrian 83. The margin portion W2c is provided to both ends of the base portion W1c. That is, a length Xc of the virtual area Wc is expressed by "Xc=X1c+2×X2c". The length X1c is one example of "base length" according to the present disclosure, and the length X2c is one example of "margin length" according to the present disclosure.

In the case where the own vehicle 1 is caused to travel along the intended path R1, the controller 10 sets the length X1c of the base portion W1c based on the formula expressed by "X1c=V3×te1". That is, the controller 10 sets the length X1c of the base portion W1c to a value which corresponds to the time te1 required for the own vehicle 1 to finish passing through the first intersecting lane 91 while turning right and to the speed V3 of the pedestrian 83.

In the case where the own vehicle 1 is caused to travel along the intended path R2, the controller 10 sets the length X1c of the base portion W1c based on the formula expressed by "X1c=V3×te2". That is, the controller 10 sets the length X1c of the base portion W1c to a value which corresponds to the time te2 required for the own vehicle 1 to finish passing through the first intersecting lane 91 while traveling straight and to the speed V3 of the pedestrian 83.

In the case where the own vehicle 1 is caused to travel along the intended path R3, the controller 10 sets the length X1c of the base portion W1c based on the formula expressed by "X1c=V3×te3". That is, the controller 10 sets the length X1c of the base portion W1c to a value which corresponds to the time te3 required for the own vehicle 1 to finish merging into the first intersecting lane 91 while turning left and to the speed V3 of the pedestrian 83.

In any of the cases where the own vehicle 1 is caused to travel along any one of the intended paths R1 to R3, the controller 10 reads the value Lw which corresponds to the pedestrian from the memory 12, and sets the value Lw as the length X2c of the margin portion W2c. The value Lw is larger than the value Lp which corresponds to a passenger car, and the value Lt which corresponds to a two-wheeled vehicle.

The controller 10 causes the virtual area Wc having such a shape to move with the advance of the pedestrian 83 (in other words, causes the virtual area Wc to advance toward the own vehicle 1 together with the pedestrian 83). The controller 10 controls the automatic brake to prevent the own vehicle 1 from contacting with this virtual area Wc in the same manner as the case where a passenger car or a two-wheeled vehicle is approaching.

Figure 5:
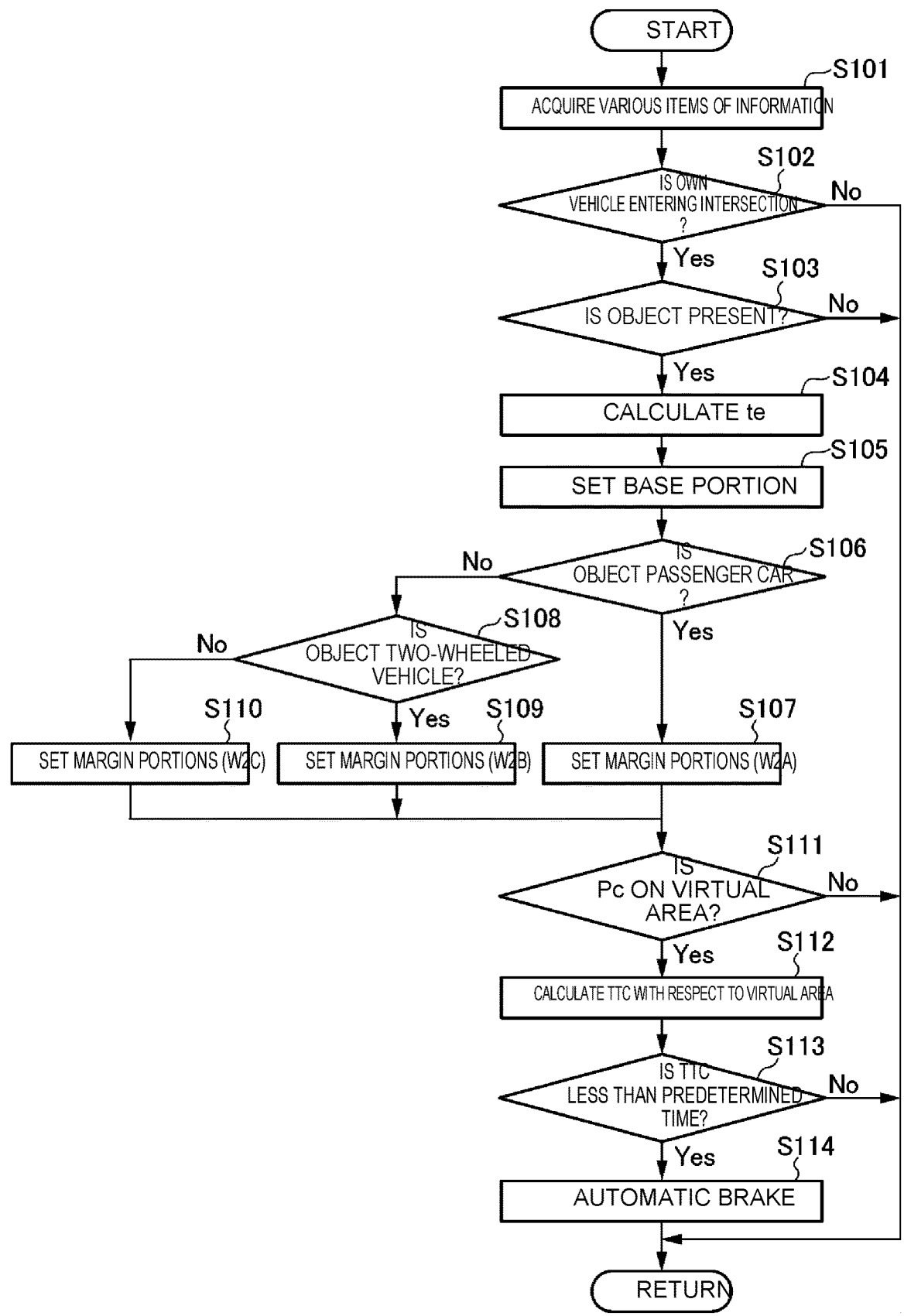
FIG. 5 is a flowchart showing a process performed by a controller according to the embodiment.

Next, the process performed by the controller 10 will be described with reference to FIG. 5. FIG. 5 is a flowchart showing a process performed by the controller 10 according to the embodiment. The controller 10 repeatedly performs the process of the flowchart in a predetermined cycle (in a 100 ms cycle, for example).

First, in step S101, the controller 10 acquires various items of information from the above-mentioned plurality of sensors and switches. Specifically, the controller 10 acquires various items of information based on signals inputted from the camera 21, the radar 22, the vehicle speed sensor 23, the acceleration sensor 24, the yaw rate sensor 25, the steering wheel angle sensor 26, the accelerator sensor 27, the brake sensor 28, the positioning device 29, the navigation device 30, the communication device 31, and the manipulation device 32.

Next, in step S102, the controller 10 determines whether or not the own vehicle 1 is attempting to enter the intersection. Specifically, the controller 10 determines whether or not an intersection is present in the vicinity of the own vehicle 1 and in the advancing direction of the own vehicle 1 based on signals (which correspond to image data) inputted from the camera 21, signals (which correspond to map information and current vehicle position information) inputted from the navigation device 30, and signals (which correspond to road-vehicle communication) inputted from the communication device 31. When it is determined that the own vehicle 1 is attempting to enter the intersection (step S102: Yes), the controller 10 advances the process to step S103. On the other hand, when it is not determined that the own vehicle 1 is attempting to enter the intersection (step S102: No), the controller 10 causes the process to skip a series of routines shown in this flowchart.

Next, in step S103, the controller 10 determines whether or not an object 8 (which corresponds to the above-mentioned crossing vehicle 81, two-wheeled vehicle 82, or pedestrian 83) approaching the own vehicle 1 while advancing in the intersecting lane is present. Specifically, based on signals (which correspond to image data) inputted from the camera 21, signals inputted from the radar 22, signals (signals which correspond to inter-vehicle communication) inputted from the communication device 31 or other signals, the controller 10 performs a process for detecting the object 8 approaching the own vehicle 1. As a result, when the object 8 approaching the own vehicle 1 is detected, the controller 10 determines that the object 8 is present (step S103: Yes), and the process advances to step S104. On the other hand, when the object 8 approaching the own vehicle 1 is not detected, the controller 10 determines that the object 8 is not present (step S103: No), so that the process skips the series of routines shown in this flowchart.

Next, in step S104, the controller 10 calculates the time te (which corresponds to the above-mentioned times te1 to te3) required for the own vehicle 1 to arrive at the point Pe (which corresponds to the above-mentioned points Pe1 to Pe3) on the intended path R (which corresponds to the above-mentioned intended paths R1 to R3). That is, the controller 10 calculates the time te (which corresponds to the above-mentioned times te1, te2) required for the own vehicle 1 to finish passing through the intersecting lane where the object 8 is advancing, or the time te (which corresponds to the above-mentioned time te3) required for the own vehicle 1 to finish merging into the intersecting lane where the object 8 is advancing. Specifically, the controller 10 first identifies the point Pe where the intended path R and the division line L1 or the extension L2 intersect with each other. Then, the controller 10 calculates the time te required for the rear end 1b of the own vehicle 1 to arrive at the point Pe based on the speed and the like of the own vehicle 1.

Next, in step S105, the controller 10 sets the base portion W1 (which corresponds to the above-mentioned base portions W1a to W1c) of the virtual area W (which corresponds to the above-mentioned virtual areas Wa to Wc). As described above, the length X1 (which corresponds to the above-mentioned lengths X1a to X1c) of the base portion W1 is set based on a distance obtained by multiplying the speed V (which corresponds to the above-mentioned speeds V1 to V3) of the object 8 by the time te required for the own vehicle 1 to finish passing through the intersecting lane where the object 8 is advancing, or by the time te required for the own vehicle 1 to finish merging into the intersecting lane where the object 8 is advancing. The controller 10 sets the base portion W1 which extends from a rear end 8b (which corresponds to the above-mentioned rear ends 81b to 83b) of the object 8 in the advancing direction of the object 8 by the length X1.

Next, in step S106, the controller 10 determines whether or not the object 8 is a passenger car. Specifically, the controller 10 performs a process for distinguishing the kind of the object 8 based on signals (which correspond to image data) inputted from the camera 21, signals inputted from the radar 22, signals (signals which correspond to inter-vehicle communication) inputted from the communication device 31 or other signals. When it is determined that the object 8 is a passenger car (step S106: Yes), the controller 10 advances the process to step S107.

Next, in step S107, the margin portions W2 (which correspond to the above-mentioned margin portions W2a) of the virtual area W are set. As described above, the controller 10 reads the value Lp which corresponds to a passenger car from the memory 12, and sets the value Lp as the length X2 (the above-mentioned length X2a) of the margin portion W2.

On the other hand, when it is not determined in step S106 that the object 8 is a passenger car (step S106: No), the controller 10 advances the process to step S108.

Next, in step S108, the controller 10 determines whether or not the object 8 is a two-wheeled vehicle. When it is determined that the object 8 is a two-wheeled vehicle (step S108: Yes), the controller 10 advances the process to step S109. In step S109, the controller 10 sets the margin portions W2 (which correspond to the above-mentioned margin portions W2b) of the virtual area W. As described above, the controller 10 reads the value Lt which corresponds to the two-wheeled vehicle from the memory 12, and sets the value Lt as the length X2 (which corresponds to the above-mentioned length X2b) of the margin portion W2.

On the other hand, when it is not determined in step S108 that the object 8 is a two-wheeled vehicle (step S108: No), the controller 10 advances the process to step S110. In step S110, the controller 10 sets the margin portions W2 (which correspond to the above-mentioned margin portions W2c) of the virtual area W. As described above, the controller 10 reads the value Lw which corresponds to a pedestrian from the memory 12, and sets the value Lw as the length X2 (which corresponds to the above-mentioned length X2c) of the margin portion W2.

Next, in step S111, the controller 10 determines whether or not the point Pc is present on the virtual area W. In other words, the controller 10 determines whether or not the virtual area W (particularly, the front end of the virtual area W) arrives at the point Pc due to advance of the object 8. Specifically, the controller 10 performs the determination in step S111 based on the position of the point Pc identified as described above and the position of the front end of the virtual area W which includes the base portion W1 and the margin portions W2. As a result, when it is determined that the point Pc is present on the virtual area W (step S111: Yes), the controller 10 advances the process to step S112.

On the other hand, when it is not determined in step S111 that the point Pc is present on the virtual area W (step S111: No), the controller 10 causes the process to skip the series of routines shown in this flowchart. When the point Pc is not present on the virtual area W as described above, the object 8 is sufficiently separated from the own vehicle 1, that is, there is no possibility of a collision with the object 8 even if the own vehicle 1 enters the intersecting lane. Accordingly, the controller 10 does not perform an automatic brake control based on the virtual area W.

Next, in step S112, the controller 10 calculates TTC of the own vehicle 1 with respect to the virtual area W. Specifically, it is assumed that the own vehicle 1 collides with the virtual area W when the front end 1a of the own vehicle 1 arrives at the point Pc. Accordingly, the controller 10 uses the time required for the front end 1a of the own vehicle 1 to arrive at the point Pc as TTC.

Next, in step S113, the controller 10 determines whether or not TTC calculated as described above is less than a predetermined time. The predetermined time is a threshold of TTC which specifies timing at which the operation of the automatic brake should be started to cause the own vehicle 1 to stop without entering the intersection. The predetermined time is set by a predetermined arithmetic expression, a simulation, an experiment or the like (the predetermined time may be a fixed value or a variable value).

As a result of step S113, when it is determined that TTC is less than the predetermined time (step S113: Yes), the controller 10 advances the process to step S114. In step S114, the controller 10 controls the braking device via the brake control device 52 to cause the automatic brake to be operated, that is, to cause the own vehicle 1 to be automatically braked. With such control, a braking force is applied to the own vehicle 1 to decelerate the own vehicle 1 and hence, the own vehicle 1 is stopped in front of the virtual area W.

Note that the controller 10 may control the warning control device 54 such that a warning is issued from the warning device when the automatic brake is operated as described above. That is, the controller 10 may cause an image and/or voice for a notification of high possibility of a collision with the crossing vehicle to be outputted on/from the display device and/or the speaker with the operation of the automatic brake. For example, it is preferable to issue a warning from the warning device before the automatic brake is operated.

On the other hand, as a result of step S113, when it is not determined that TTC is less than the predetermined time (step S113: No), that is, when TTC is the predetermined time or more, the controller 10 causes the process to skip the series of routines shown in this flowchart. In this case, the controller 10 does not cause the automatic brake to be operated.

Next, the manner of operation and advantageous effects according to the embodiment will be described.

According to this configuration, the controller 10 sets the virtual area W. The virtual area W is set to avoid a collision between the own vehicle 1 and the object 8, and the virtual area W is an application object of a control of causing the own vehicle 1 to be automatically braked.

Specifically, the controller 10 sets, between the own vehicle 1 and the object 8, the virtual area W which moves with the advance of the object 8, and which extends in the advancing direction of the object 8, and the controller 10 performs a control of causing the own vehicle 1 to be automatically braked to prevent a collision of the own vehicle 1 with the object 8. With such a configuration, it is possible to cause the own vehicle 1 to be stopped at a position relatively separated from the object 8 to avoid a collision between the own vehicle 1 and the object 8.

The behavior of an object greatly differs depending on a kind of the object. If the virtual area W is set for an object having a relatively large behavior change in the same manner as another object having a relatively small behavior change, there is the concern that it becomes difficult to avoid a collision between the own vehicle 1 and the object. Further, if the excessively long virtual area W is set to avoid a collision between the own vehicle 1 and the object with certainty, there is the concern that the own vehicle 1 is unnecessarily automatically braked, so that smooth traveling of the own vehicle 1 may be interfered or a driver may feel inconvenience.

In view of the above, the controller 10 sets the length X (which corresponds to the above-mentioned lengths Xa to Xc) of the virtual area W corresponding to the kind of the object 8. With such a configuration, it is possible to avoid a collision between the own vehicle 1 and the object 8 while inhibiting the own vehicle 1 from being unnecessarily automatically braked.

Further, the controller 10 is configured to set the length X1 of the base portion W1 based on the time te required for the own vehicle 1 to finish passing through the intersecting lane where the object 8 is advancing, or the time te required for the own vehicle 1 to finish merging into the intersecting lane where the object 8 is advancing, set the length X2 of the margin portion W2 based on the kind of the object 8, and set the length X of the virtual area W based on the length obtained by adding the length X2 to the length X1. By setting the length X of the virtual area W based on the length obtained by such addition, it is possible to avoid a collision between the own vehicle 1 and the object 8 with certainty using the virtual area W having the length X which corresponds to the kind of the object 8.

Further, the controller 10 is configured to set the length X1 of the base portion W1 based on a distance obtained by multiplying the speed V of the object 8 by the time te required for the own vehicle 1 to finish passing through the intersecting lane where the object 8 is advancing, or by the time te required for the own vehicle 1 to finish merging into the intersecting lane where the object 8 is advancing. According to this configuration, the length X1 of the base portion W1 can be set to a value which corresponds to the time required for the own vehicle 1 to finish moving to a position where a collision with the object 8 can be avoided, and which corresponds to the speed V of the object 8. By setting such a virtual area W, it is possible to avoid a collision of the own vehicle 1 with the object 8 with certainty.

Further, the controller is configured such that, in a case where the object 8 is a pedestrian, the controller sets the length X2 of the margin portion larger than the length of the margin portion in a case where the object 8 is a two-wheeled vehicle. According to this configuration, the controller 10 sets the length X2 of the margin portion W2 for a pedestrian, which is an object having a relatively large behavior change, larger than the length of the margin portion for a two-wheeled vehicle, which is an object having a relatively small behavior change. With such a configuration, it is possible to avoid a collision of the own vehicle 1 with a pedestrian with certainty.

The virtual area W according to the above-mentioned embodiment includes the margin portions W2 provided to both ends of the base portion W1. However, the present disclosure is not limited to such a mode. For example, a mode where the margin portion W2 is provided to only one end of the base portion W1 also falls within the scope of the present disclosure.

The following description relates to a computer environment in which embodiments of the present disclosure may be implemented. This environment may include an embedded computer environment, local multi-processor embodiment, remote (e.g., cloud-based) environment, or a mixture of all the environments.

Figure 6:
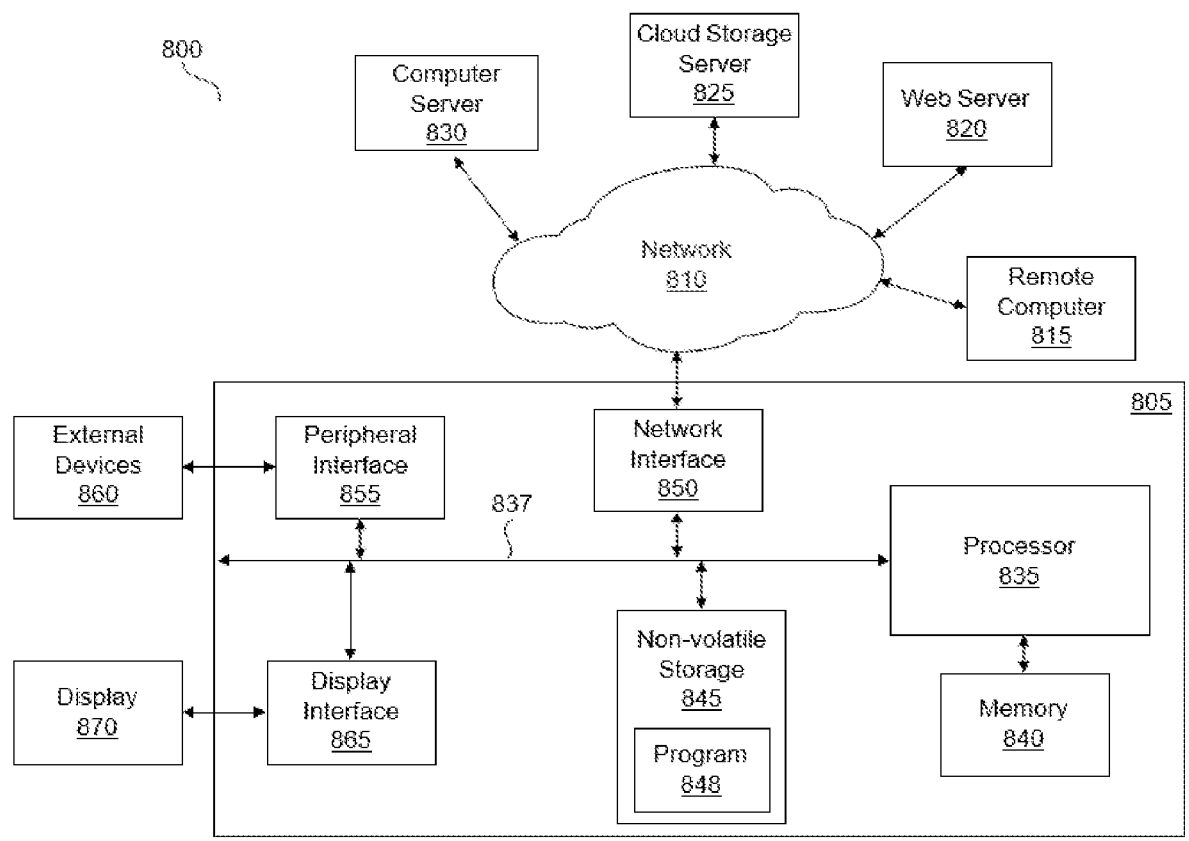
FIG. 6 is a block diagram of computer-based circuitry that may be used to implement control features of the present disclosure.

FIG. 6 illustrates a block diagram of a computer that may implement the various embodiments described herein. The present disclosure may be embodied as a system, a method, and/or a computer program product. The computer program product may include a computer readable storage medium on which computer readable program instructions are recorded that may cause one or more processors to carry out aspects of the embodiment.

The non-transitory computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 6 is a functional block diagram illustrating a networked system 800 of one or more networked computers and servers. In an embodiment, the hardware and software environment illustrated in FIG. 6 may provide an exemplary platform for implementation of the software and/or methods according to the present disclosure. Referring to FIG. 6, a networked system 800 may include, but is not limited to, computer 805, network 810, remote computer 815, web server 820, cloud storage server 825 and compute server 830. In some embodiments, multiple instances of one or more of the functional blocks illustrated in FIG. 6 may be employed.

Additional detail of computer 805 is shown in FIG. 6. The functional blocks illustrated within computer 805 are provided only to establish exemplary functionality and are not intended to be exhaustive. And while details are not provided for remote computer 815, web server 820, cloud storage server 825 and compute server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC). Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and compute server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and compute server 830.

REFERENCE SIGNS LIST

1 own vehicle
10 controller
21 camera (object information acquisition sensor)
22 radar (object information acquisition sensor)
31 communication device (object information acquisition sensor)
81 crossing vehicle (object)
82 two-wheeled vehicle (object)
83 pedestrian (object)
90 own-vehicle lane
91 first intersecting lane (intersecting lane)
93 intersection
100 vehicle control device
Wa, Wb, We virtual area

What is claimed is:
1. A vehicle control device comprising:
an object information acquisition sensor configured to acquire information relating to an object approaching an own vehicle while advancing in an intersecting lane, the intersecting lane being a lane that intersects an own vehicle lane at an intersection at a time the own vehicle approaches the intersection; and
a controller configured to automatically brake the own vehicle to avoid a collision between the own vehicle and the object under a condition that the own vehicle enters the intersecting lane, wherein
the controller is configured to
set, between the own vehicle and the object, a virtual area that moves with the object and that extends in an advancing direction of the object, by setting a base length based on a time required for the own vehicle to finish passing through the intersecting lane where the object advances, or a time required for the own vehicle to finish merging into the intersecting lane where the object advances, setting a margin length based on a kind of the object, and setting a length of the virtual area corresponding to the kind of the object, based on a length obtained by adding the margin length to the base length, and
automatically brake the own vehicle to prevent the own vehicle from contacting with the virtual area.
2. The vehicle control device according to claim 1, wherein the controller is configured to set the base length based on a distance obtained by multiplying a speed of the object by a time required for the own vehicle to finish passing through the intersecting lane where the object advances, or a time required for the own vehicle to finish merging into the intersecting lane where the object advances.

3. The vehicle control device according to claim 2, wherein, the controller is configured such that, under a condition that the object is a pedestrian, the controller sets the margin length larger than a margin length in a case where the object is a two-wheeled vehicle.

4. The vehicle control device according to claim 1, wherein, the controller is configured such that, under a condition that the object is a pedestrian, the controller sets the margin length larger than a margin length in a case where the object is a two-wheeled vehicle.

5. The vehicle control device according to claim 1, wherein the controller comprises a single processor.

6. The vehicle control device according to claim 1, wherein the controller comprises multiple processors including at least one processor that is not included in the vehicle.

7. A vehicle control method comprising:

acquiring with an object information acquisition sensor information relating to an object approaching an own vehicle while advancing in an intersecting lane, the intersecting lane being a lane that intersects an own vehicle lane at an intersection at a time the own vehicle approaches the intersection; and automatically braking the own vehicle to avoid a collision between the own vehicle and the object under a condition that the own vehicle enters the intersecting lane, the automatically braking including setting, between the own vehicle and the object, a virtual area that moves with the object and that extends in an advancing direction of the object, by setting a base length based on a time required for the own vehicle to finish passing through the intersecting lane where the object advances, or a time required for the own vehicle to finish merging into the intersecting lane where the object advances, setting a margin length based on a kind of the object, and setting a length of the virtual area corresponding to the kind of the object, based on a length obtained by adding the margin length to the base length, and automatically braking the own vehicle to prevent the own vehicle from contacting with the virtual area.

8. The vehicle control method according to claim 7, wherein the setting the base length includes setting the base length based on a distance obtained by multiplying a speed of the object by a time required for the own vehicle to finish passing through the intersecting lane where the object advances, or a time required for the own vehicle to finish merging into the intersecting lane where the object advances.

9. The vehicle control method according to claim 8, wherein, under a condition that the object is a pedestrian, the setting the margin length includes setting the margin length larger than a margin length in a case where the object is a two-wheeled vehicle.

10. The vehicle control method according to claim 7, wherein, under a condition that the object is a pedestrian, the setting the margin length includes setting the margin length larger than a margin length in a situation where the object is a two-wheeled vehicle.

11. A non-transitory computer readable storage including computer readable instructions that when executed by a controller cause the controller to execute a vehicle control method, the method comprising:

acquiring with an object information acquisition sensor information relating to an object approaching an own vehicle while advancing in an intersecting lane, the intersecting lane being a lane that intersects an own vehicle lane at an intersection at a time the own vehicle approaches the intersection; and automatically braking the own vehicle to avoid a collision between the own vehicle and the object under a condition that the own vehicle enters the intersecting lane, the automatically braking including setting, between the own vehicle and the object, a virtual area that moves with the object and that extends in an advancing direction of the object, by setting a base length based on a time required for the own vehicle to finish passing through the intersecting lane where the object advances, or a time required for the own vehicle to finish merging into the intersecting lane where the object advances, setting a margin length based on a kind of the object, and setting a length of the virtual area corresponding to the kind of the object, based on a length obtained by adding the margin length to the base length, and automatically braking the own vehicle to prevent the own vehicle from contacting with the virtual area.

12. The non-transitory computer readable storage of claim 11, wherein the setting the base length includes setting the base length based on a distance obtained by multiplying a speed of the object by a time required for the own vehicle to finish passing through the intersecting lane where the object advances, or a time required for the own vehicle to finish merging into the intersecting lane where the object advances.

13. The non-transitory computer readable storage of claim 12, wherein, under a condition that the object is a pedestrian, the setting the margin length includes setting the margin length larger than a margin length in a case where the object is a two-wheeled vehicle.

14. The non-transitory computer readable storage of claim 11, wherein, under a condition that the object is a pedestrian, the setting the margin length includes setting the margin length larger than a margin length in a situation where the object is a two-wheeled vehicle.

* * * * *